United States Patent Office 2,755,688
Patented July 24, 1956

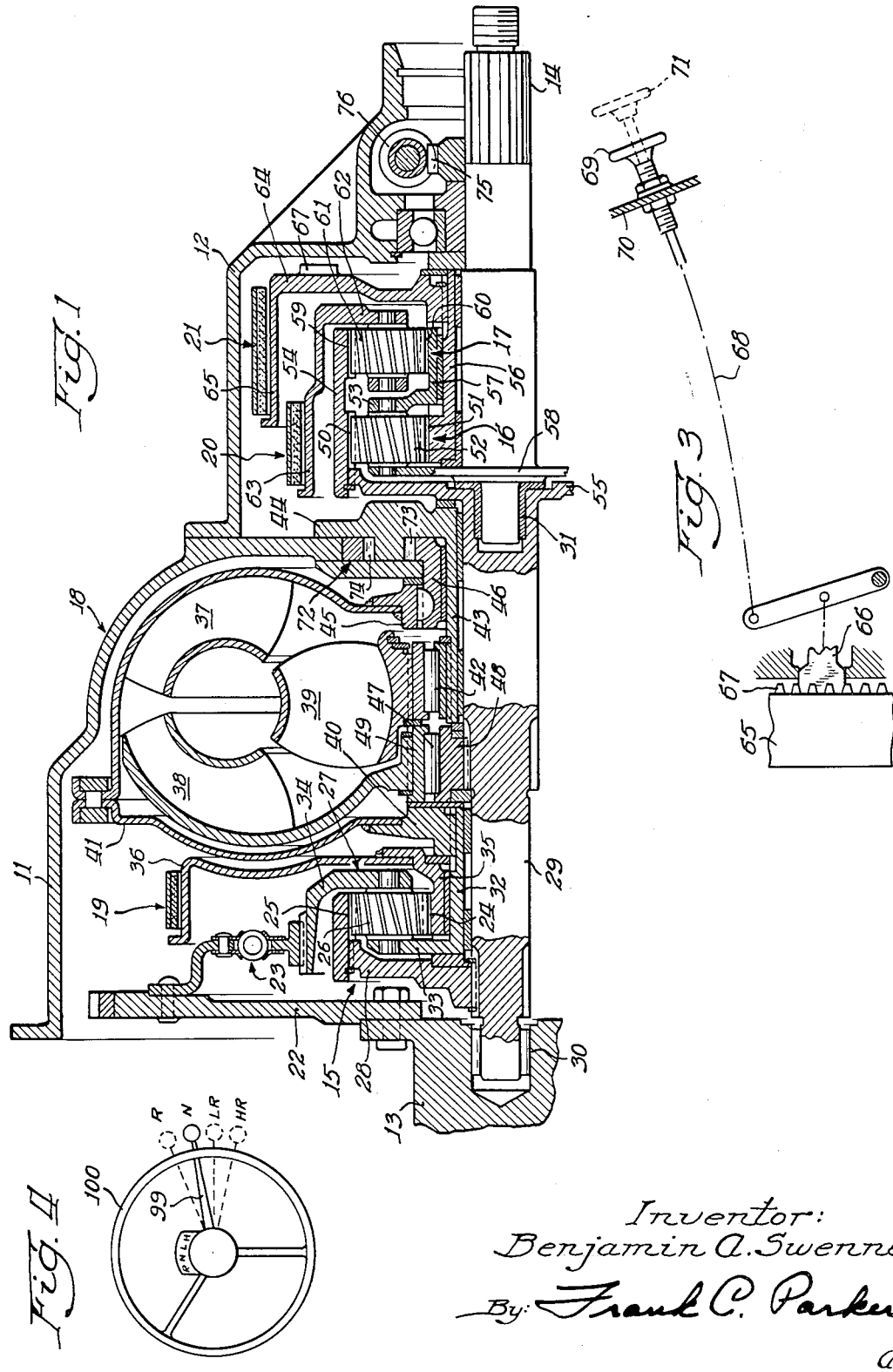

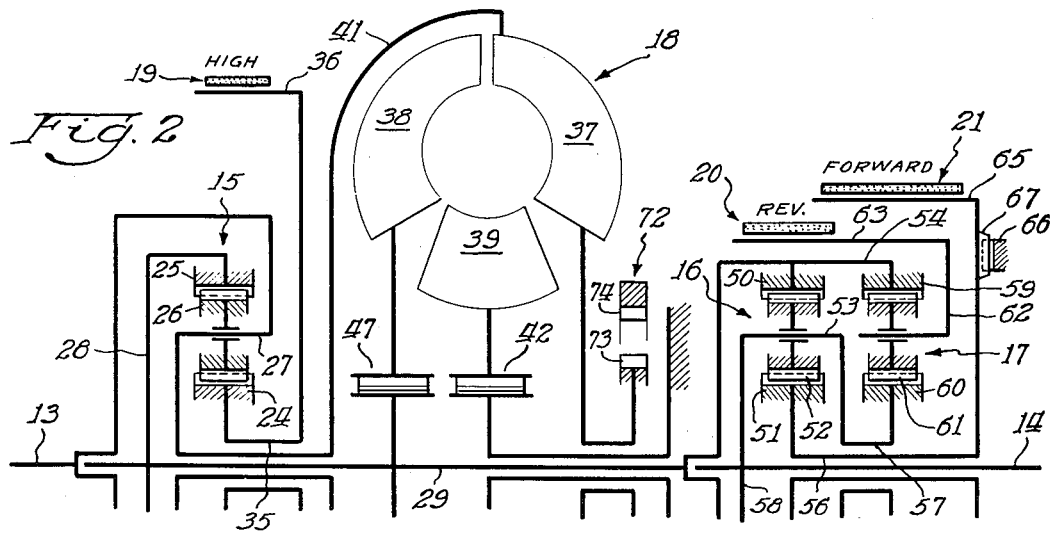

2,755,688

TRANSMISSION

Benjamin A. Swennes, Kalamazoo, Mich., assignor to The Borg-Warner Corporation, Chicago, Ill., a corporation of Illinois Application November 27, 1951, Serial No. 258,413

6 Claims. (Cl. 74—677)

The present invention relates to automotive vehicle transmissions and control means therefor.

One object of the present invention is to provide a simple transmission for an automotive vehicle employing planetary gearing and a hydraulic torque converter that will provide two forward speed drives and one reverse drive between the engine and the driving wheels of the vehicle.

Another object of the invention is to provide a transmission for an automotive vehicle having three planetary gear sets between the drive and driven shafts, wherein each of the planetary gear sets is provided with a fluid pressure operated brake and wherein each of the brakes is controlled according to the position of a manually operable selector lever to thereby complete one of a plurality of possible gear ratios through the transmission.

Another object of the invention is to provide a transmission for an automotive vehicle employing a planetary gear set and a hydraulic torque converter wherein the hydraulic torque converter is effective to multiply torque transmitted through the transmission while it is operating in a low speed drive, and the planetary gear set is effective to cause a driven shaft of the transmission to overrun the driven element of the hydraulic torque converter when the transmission is operating in a high speed drive. In connection with this object of the invention, the driven element or turbine of the hydraulic torque converter is connected with an intermediate driven shaft of the transmission through the medium of a one-way engaging device that functions to permit the hydraulic torque converter to drive the intermediate driven shaft when the transmission is conditioned for low speed forward drive and which overruns and thereby breaks the low speed forward drive power train when the transmission is conditioned for high speed forward drive.

Another object of the invention is to provide a transmission for an automotive vehicle having a first planetary gear set for completing a low forward speed drive through the transmission, a second planetary gear set for completing a reverse drive through the transmission, and a third planetary gear set for completing a high speed forward drive through the transmission when the first planetary gear set is also operating, and also including a hydraulic torque converter which is effective to convert torque in either the reverse or the low speed forward drive through the transmission.

Another object of the present invention is to provide a transmission for an automotive vehicle wherein a planetary gear set is effective to establish a forward speed drive through the transmission whenever the sun gear of the gear set is held from rotation, and wherein a friction brake is provided for braking the sun gear to establish the forward speed drive through the transmission and a manually operable positive brake is provided for braking the sun gear from rotation to complete the forward speed drive through the transmission whenever it is desired to start the vehicle by pushing or pulling it and which is also effective to connect the engine of the vehicle with the driven wheels thereof in order to provide an additional braking effect for the vehicle when it is parked.

The above and other objects and numerous advantages will become apparent from the following detailed description when read in conjunction with the accompanying drawings, wherein:

Fig. 1 is a side elevation view, shown partly in section, of the transmission disclosed by the present invention;

Fig. 2 is a schematic illustration of the transmission disclosed in Fig. 1;

Fig. 3 is a detail view of the taxi-start and parking brake;

Fig. 4 is a view of the vehicle steering wheel and selector lever which is manually positionable in order to select the various drives through the transmission; and Fig. 5 is a schematic illustration of the hydraulic control circuit for controlling the operation of the various brakes used in the transmission.

With reference now to the drawings, wherein like reference numerals identify the same parts in the several views, the transmission is housed in a front housing 11 and a rear housing 12 and is designed to interconnect a driving shaft 13, which may itself constitute the crankshaft of an automotive vehicle engine (not shown) or may be a shaft driven by such crankshaft, with a driven shaft 14 that is adapted to drive the rear wheels (not shown) of the vehicle. The transmission includes three planetary gear sets 15, 16 and 17, a hydraulic torque converter 18, and three friction brakes 19, 20 and 21 for braking a reaction element in the gear sets 15, 16 and 17 respectively.

The drive shaft 13 has a fly-wheel 22 bolted thereto and the flywheel is bolted to a conventional torsional vibration dampener 23. The planetary gear set 15 comprises a sun gear 24, a ring gear 25, a plurality of planetary pinions 26 and a planetary pinion carrier 27 for rotatably mounting the planetary pinions 26. Each of the planetary pinions 26 is in mesh with both the sun gear 24 and the ring gear 25 and a disc 28, splined to the ring gear 25 is also splined to an intermediate shaft 29 piloted internally, as at 30, in the drive shaft 13 and piloted externally, as at 31, with respect to the driven shaft 14. A short sleeve shaft 32 rotatably mounted on the intermediate shaft 29 has a flange 33 for mounting the carrier 27 and an axially extending flange 34 of the carrier 27 is splined to the vibration dampener 23. Thus there is a direct connection between the drive shaft 13 and the short sleeve shaft 32 which mounts the planetary gear carrier 27 rotatably with respect to the intermediate shaft 29. The sun gear 24 is integrally formed on a short sleeve 35 and the sleeve 35 has a brake drum 36 welded thereto. The friction brake 19 is operable to engage the drum 36 to thereby brake rotation of the sun gear 24. When the brake band 19 engages the drum 36 the sun gear 24 is held against rotation, whereupon it constitutes a reaction element for the planetary gear set 25 so that upon rotation of the driving shaft 13 the carrier 27 is rotated around the sun gear 24 and the ring gear 25 is rotated in the same direction but at an increased speed.

The hydraulic torque converter 18 comprises an impeller 37, a runner 38, and a stator 39. The impeller 37 is directly connected to the short sleeve shaft 32 by means of a hub 40 splined to the shaft 32 and a disc member 41 welded to both the hub 40 and the impeller 37. It is therefore obvious, that upon rotation of the drive shaft 13 the impeller 37 is also rotated in unison therewith. The stator element 39 is held against reverse rotation by means of a one-way brake 42 mounted between the stator 39 and a stationary sleeve 43 having a flange 44 welded to the casing 11. The impeller 37 is welded to a short sleeve 45 that is splined to a sleeve shaft 46 rotatable about the stationary sleeve 43. The torque converter 18 is of conventional design and accordingly further description of the details thereof is not deemed necessary. A one-way clutch 47, having a driven element 48 splined to the intermediate shaft 29, has a driving element 49 splined to the runner 38 and functions to permit the intermediate shaft 29 to overrun the runner element 38 of the hydraulic torque converter 18. Thus it is apparent, that upon engagement of the friction brake 19 the intermediate shaft 29 overruns the turbine or runner 38 of the hydraulic torque converter 18.

The planetary gear set 16 comprises a ring gear 50, a sun gear 51, a plurality of planetary pinions 52 and a planet pinion carrier 53. The planetary pinions 52 are in mesh with both the ring gear 50 and the sun gear 51. The ring gear 50 is integrally formed on a collar 54 splined to a radially extending flange 55 on the end of the intermediate shaft 29. The sun gear 51 is formed integrally with a sleeve shaft 56 rotatably mounted around the driven shaft 14. The carrier 53 is integrally formed on a sleeve shaft 57 rotatably mounted on the sleeve shaft 56 and is connected to rotate with the driven shaft 14 by means of a flange or disc 58 secured to the driven shaft 14.

The planetary gear set 17 comprises a ring gear 59 integrally formed on the collar 54, a sun gear 60 integral with the sleeve shaft 57, a plurality of planetary pinions 61 in mesh with both the ring gear 59 and the sun gear 60, and a planetary gear carrier 62 for rotatably mounting the planetary pinions 61. The carrier 62 is welded to a brake drum 63 that is designed to be engaged by the brake band 20 and the sleeve shaft 56 is splined to a radially extending disc 64 welded to a brake drum 65 that is designed to be engaged by the brake band 21. Engagement of the brake band 20 with the drum 63 holds the carrier 62 against rotation and engagement of the brake band 21 with the drum 65 holds the sun gear 51 against rotation.

Fig. 2 shows schematically and Fig. 3 shows in detail, a positive brake in the form of a pawl 66 that is engageable with a set of teeth 67 formed on the forward brake drum 65 in order to permit starting the vehicle engine by either pushing or towing the vehicle and also for connecting the driven shaft 14 with the drive shaft 13 for causing the engine to brake the vehicle when it is parked. The pawl 66 is operated by means of a Bowden wire 68 that leads to a manually operable lever 69 located on the dashboard 70 of the vehicle. As will be apparent from Fig. 3, when the lever 69 occupies its position, as shown, the pawl 66 engages the teeth 67 in order to positively brake the drum 65. When the lever 69 is pulled out to its dotted position 71 the pawl 66 is disengaged from the teeth 67 on the drum 65 and the drum 65 is free to rotate assuming that the band 21 is disengaged therefrom.

An internal gear oil pump 72 is provided for supplying oil under pressure for operating the servos for the friction brakes 19, 20 and 21, and charging the hydraulic torque converter 18 and consists of a drive gear 73 and a driven gear 74. The drive gear 73 is formed integrally on the end of the sleeve 46 that rotates with the impeller 37. The pump operates whenever the drive shaft 13 rotates due to the fact that there is a direct connection between the drive shaft 13 and the drive gear 73 of the pump 72. The driven shaft 14 has a gear 75 secured thereto for driving a speedometer gear 76.

As has been stated previously, the present transmission provides two forward speed drives between the drive shaft 13 and the driven shaft 14 and one reverse drive between the shafts 13 and 14. In the low forward speed range of the transmission the forward brake band 21 alone is engaged with its brake drum 65 and during this speed range torque from the engine is multiplied by both the torque converter 18 and the planetary gear set 16. During the high speed range both the forward brake band 21 and the high brake band 19 are engaged respectively with their brake drum. Under this condition the intermediate shaft 29 overruns the torque converter 18 and engine torque is multiplied only by the planetary gear set 16. During reverse drive between the shafts 13 and 14 only the reverse brake band 20 is engaged with its drum 63 and under this condition engine torque is multiplied by both the torque converter 18 and the planetary gear set 17.

When the transmission is conditioned for neutral the high brake band 19 is engaged with its drum 36. However, in neutral the forward brake band 21 and the reverse brake band 20 are both disengaged from their respective brake drums. In neutral, with the high brake band 19 engaged with its drum 36, the sun gear 24 is held against rotation and the driving shaft 13 drives the carrier 27 in a forward direction. The planetary pinion 26 in turn drives the ring gear 25 and the intermediate shaft 29 at an increased speed with respect to the speed of rotation of the driving shaft 13. The collar 54 is likewise driven in a forward direction at this increased speed. Due to the fact that the vehicle is stationary the driven shaft 14 is stationary and the carrier 53 and sun gear 60, both of them being directly connected to the driven shaft 14, are likewise held stationary. Rotation of the ring gears 50 and 59 in a forward direction therefore causes the sun gear 51 and brake band 65 to idle in a reverse direction and the carrier 62 and brake drum 63 to idle in a forward direction. Thus no drive is transmitted to the driven shaft 14.

When the transmission is conditioned for its low speed range, that is, when the forward brake band 21 alone is engaged with its brake drum 65, a power train from the drive shaft 13 to the driven shaft 14 is established which extends from the drive shaft 13, through the carrier 27, through the impeller 37 and turbine 38 of the torque converter 18, through the one-way clutch 47, through the intermediate shaft 29, through the collar 54, through the ring gear 50, planetary pinions 52, and planetary gear carrier 53 to the driven shaft 14. Initially there is a torque multiplication through the hydraulic torque converter 18, but as the speed of the turbine 38 gradually increases until it reaches the speed of the impeller 37, the stator 39 which is permitted to rotate forwardly through the medium of the one-way brake 42, rotates with the turbine 38 and impeller 37 and the torque converter 18 functions as a fluid coupling. At this time the speed of the intermediate shaft 29 is substantially equal to the rotational speed of the drive shaft 13 and thereafter torque multiplication takes place only in the planetary gear set 16. Due to the one-way clutch 47 between the turbine 38 of the torque converter 18 and the intermediate shaft 29, the intermediate shaft 29 may overrun the turbine 38 when the transmission is operating in low speed range. It is therefore apparent that the present transmission provides free wheeling in the low speed range.

When the transmission is conditioned for high speed drive between the drive shaft 13 and the driven shaft 14 it will be recalled that both the forward brake band 21 and the high brake band 19 are engaged respectively with their brake drums. Under this condition the power train proceeds from the drive shaft 13 to the carrier 27 and to the impeller 37 of the torque converter 18. Due to the fact that the sun gear 24 is held stationary, the ring gear 25 and the intermediate shaft 29 are driven at an increased speed or overdrive with respect to the drive shaft 13. Since the impeller 37 of the hydraulic torque converter 18 cannot drive the turbine element 38 at a speed greater than the speed of rotation of the drive shaft 13, the intermediate shaft 29 overruns the turbine element 38 by means of the overrunning clutch 47. Thus the intermediate shaft 29, which is being driven at a speed of rotation which is higher than the speed of rotation of the drive shaft 13, drives the ring gear 50 of the planetary gear set 16, and through the action of the planetary pinion 52 and the carrier 53, when the sun gear 51 is held stationary by means of the forward brake 21, the driven shaft 14 is driven at a speed of rotation slightly less than the speed of rotation of the intermediate shaft 29. It is therefore apparent that only the planetary gear set 16 multiplies torque when the transmission is operating in its high speeed range and also there is no overrunning of either of the driven shafts 29 or 14 with respect to the drive shaft 13 during the high speed drive. Thus the high speed drive provided by the present transmission does not include the free wheeling feature which is present in the low speed range.

During reverse drive through the transmission, as was stated previously, only the reverse brake band 20 is engaged with its brake drum 63. The reverse drive power train therefore proceeds from the drive shaft 13 through the carrier 27, through the impeller 37 and turbine 38 of the torque converter 18, through the one-way clutch 47, through the intermediate shaft 29, through the collar 54, through the ring gear 59, planetary pinions 61, and sun gear 60 of the planetary gear set 17, through the sleeve shaft 57 and through the carrier 53 to the driven shaft 14. In reverse drive only the hydraulic torque converter 18 functions to multiply the torque transmitted from the engine of the vehicle, and the planetary gear set 17 reverses the direction of rotation. It is also apparent that the one-way clutch 47 is in the power path during reverse drive and consequently the transmission also provides free wheeling in the reverse drive.

When the vehicle is parked and it is desired to utilize the braking effect of the engine in addition to the conventional parking brakes of the vehicle in order to hold it stationary, the positive pawl brake, comprising the pawl 66 and teeth 65, is applied, it is being assumed that the transmission is conditioned for neutral and that when it is so conditioned when the vehicle is stationary with the engine inoperative the high speed brake band 19 is engaged with its drum 36 in order to hold the sun gear 24 stationary. Under these conditions a power train is completed that extends from the driven shaft 14 through the carrier 53, planetary pinions 52 and ring gear 50 of the planetary gear set 16, to the intermediate shaft 29, through the ring gear 25 and through the planetary pinions 26 to the carrier 27 of the planetary gear set 15, and then through the drive shaft 13 to the engine of the vehicle. This power train is substantially the same as the high speed power train however, as is obvious, it extends in the reverse direction. When it is desired to start the vehicle engine by means of pulling or pushing the vehicle, the pawl 66 is likewise engaged with the brake drum 65 and the same power train is established in order to rotate the crankshaft of the vehicle engine.

The hydraulic mechanism for manually controlling the operation of the servos that actuate the brakes 19, 20 and 21 will now be described. The high speed brake band 19 has one end anchored as indicated, and its other end is actuated by means of a rod 77 connected to a piston 78 of a high speed brake servo 79. The servo 79 also comprises a cylinder 80, within which the piston reciprocates, and a compression spring 81 seated behind the piston 78 normally urges the rod 77 to a position to engage the brake band 19 with the brake drum 36. When fluid under pressure is admitted to the cylinder 80 through a conduit 82 the piston 78 is urged to the right, whereby overcoming the spring 81, in order to disengage the band 19 from the brake drum 36. A reverse brake servo 83 comprises a cylinder 84, a piston 85 reciprocable within the cylinder 84, a piston rod 86, connected with the free end of the band 20, and a compression spring 87 normally effective to urge the piston 85 to the right in order to disengage the band 20 from the brake drum 63. When fluid under pressure is admitted to the cylinder 84 by means of a conduit 88 the piston 85 is forced to the left in order to cause engagement of the band 20 with the brake drum 63. A forward brake servo 89 comprises a cylinder 90, a piston 91, a piston rod 92 connected to the piston 91 and to the free end of the band 21, and a compression spring 93 for normally urging the piston 91 to the right in order to disengage the band 21 from the brake drum 65. When fluid under pressure is admitted to the cylinder 90 by means of a conduit 94, the piston 91 is moved to the left and the brake band 21 is thereby engaged with the brake drum 65.

A valve block 95 is bored, as at 96, and a valve 97 is reciprocable within the bore. The valve 97 is provided with a peripheral groove 98 and by means of the groove 98 a manually positionable selector lever 99 (see Fig. 4) which is located immediately beneath the steerling wheel 100 of the vehicle, is connected thereto in order to reciprocate the valve 97 within the bore 96 to its various positions corresponding to high, low, neutral and reverse drives. It is contemplated that the selector lever 99 could also be located at any other convenient location in the vehicle and it is also contemplated that the selector lever 99 may be connected with the valve 97 in any convenient and conventional manner.

The valve 97 is provided with a plurality of lands 101—105 and with a plurality of grooves 106—109 between the lands. The valve block 95 is provided with openings 110, 111 and 112, communicating respectively with the conduits 82, 88 and 94, and also has three additional openings 113, 114 and 115. The openings 113 and 115 communicate respectively with bleed conduits 116 and 117 which lead to an oil sump 118. The opening 114 communicates with a conduit 119, through which fluid under pressure is supplied by the pump 72. The pump 72 draws fluid from the sump 118 through a conduit 120 and pumps it into the conduit 119 and the groove 108. A conduit 121, which is connected to the pressure supply conduit 119, leads to a pressure relief valve 122 for controlling the pressure of the fluid entering the bore 96 through the opening 114. The pressure relief valve 122 comprises a cylinder 123, a piston 124 reciprocable within the cylinder 123, and a compression spring 125 for urging the piston 124 to a position whereby an opening leading to a relief conduit 126 is closed. As is apparent from Fig. 5 the conduit 126 leads to the sump 118 in order to drain off fluid passing through the relief valve 122 when the pressure of the fluid in the conduits 119 and 121 are sufficient to overcome the spring pressure of the spring 125 in the pressure relief valve 122.

The hydraulic circuit diagram shown in Fig. 5 does not show any conduit leading to the hydraulic torque converter or for providing lubrication for the various elements of the transmission. It is contemplated however, that conventional fluid circuits will be utilized for conveying fluid under pressure to these units.

When the vehicle engine is operating and the selector lever 99 is moved to its neutral position, as shown in Fig. 5, fluid under pressure enters the groove 108 between the two lands 103 and 104. Fluid from the groove 108 passes through an internal passageway 127, which is in communication with both grooves 108 and 106, into the groove 106. Fluid under pressure therefore passes from the groove 106 through the opening 110, through the conduit 82 into the cylinder 80 of the high speed brake servo 79. Inasmuch as the servo 79 is spring-applied and pressure-released, the fluid entering the cylinder 80 will cause disengagement of the brake 19 while the transmission is conditioned for neutral. During the neutral condition of the transmission the reverse brake band 20 and the forward brake band 21 are both disengaged from their respective drums. The reverse servo 83 is bled over a circuit extending from the cylinder 84, through the conduit 88, through the opening 112, through the groove 109, through the opening 115 and through the bleed conduit 117 to the sump 118. The compression spring 87 is therefore free to cause the band 20 to be disengaged from its drum. During neutral the forward servo 89 is bled over a circuit extending from the cylinder 90, through the conduit 94, through the opening 111, through the groove 107, through the opening 115 and through the conduit 116 to the sump 118. The compression spring 93 at this time functions to move the piston 91 to the right to cause disengagement of the brake band 21.

When the selector lever 99 is moved to its low range position the valve 97 is moved correspondingly to its low position. When the valve 97 occupies its low position the groove 106 communicates with the opening 110 and the opening 111 no longer communicates with the bleed opening 115 through the groove 107, but instead communicates with the groove 108. Fluid under pressure is supplied to the high speed servo 79 over the same circuit as was previously traced when the transmission is conditioned for neutral. Fluid under pressure is transmitted to the forward servo 89 in order to apply the brake band 21 over a circuit extending from the fluid supply conduit 119, through the opening 111, through the groove 108, through the opening 111, through the conduit 94 into the cylinder 90. The fluid in the cylinder 90 overcomes the spring 93 and thereby causes the band 21 to be applied. The reverse servo 83 is bled over the same circuit as traced for bleeding this servo during neutral.

When the manually operable selector lever 99 is moved to its high range position the valve 97 is correspondingly moved to its high position. Under this condition the opening 110 no longer communicates with the groove 106, but instead communicates with the groove 107, and the opening 111 remains in communication with the groove 108. The forward brake band 21 is therefore engaged by means of fluid passing to its servo 89 over the same circuit as traced for engaging this brake band during low range operation. The high range brake band 19 is applied at this time by the compression spring 81 due to the fact that the cylinder 80 is bled over a circuit extending through the conduit 82, through the opening 110, through the groove 107, and through the opening 113 and conduit 116 to the sump 118.

When the manually operable selector lever 99 is moved to its reverse drive position the valve 97 is likewise moved to its reverse position and under this condition the opening 112 communicates with the groove 108 so that fluid under pressure is supplied to the reverse brake servo 83. The opening 111 communicates with the groove 107 to permit bleeding of the forward servo 89, and the opening 110 communicates with the groove 106 to permit fluid under pressure to enter the right range servo 79 in order to cause disengagement of the high range brake band 19. The fluid circuit for operating the reverse servo 83 extends from the fluid supply conduit 119 through the opening 114, through the groove 108, through the opening 112, and through the conduit 88 to the cylinder 84. The forward servo 89 is bled over the same circuit as traced for bleeding this servo during neutral and the circuit for supplying fluid under pressure to the high range servo 79 is the same as the circuit traced during neutral and low range operation.

When the vehicle is standing in a parked position and the engine is inoperative, the oil pump 72 likewise is inoperative and no fluid pressure is supplied to any of the brake operating servos 79, 83 or 89. The reverse and forward speed brake bands 20 and 21 are therefore disengaged from their drums at this time, however the high range brake band 19 is applied due to the action of the compression spring 81. Therefore the movement of the pawl 66 into engagement with the teeth 67 on the brake drum 65 connects the driven shaft 14 with the engine. Thus the engine provides an additional braking effect for retaining the vehicle stationary when it is parked.

When it is desired to start the vehicle engine by either towing or pushing, the manually operable selector lever 99 may be positioned either in its neutral position or its low speed position. The pawl 66 is moved into engagement with the teeth 67 on the brake drum 65 at this time. Due to the fact that the engine is not operating, the pump 72 initially does not supply any pressure to overcome the compression spring 81 and therefore the high range brake band 19 is applied. As soon as the engine attains a sufficiently high speed to drive the pump 72 at a speed sufficiently high to supply fluid pressure to overcome the compression spring 81, the high range brake band 19 becomes disengaged from its drum and a low range drive from the drive shaft 13 to the driven shaft 14 is established.

From the foregoing description of the present invention it is apparent that a simple transmission providing two forward speed ranges and a single reverse range has been provided. Due to the fact that the hydraulic torque converter 18 functions at all times during low speed forward drive, smooth starting of the vehicle and smooth operation of the transmission is attained. Because of the overrunning clutch between the turbine element 38 of the hydraulic torque converter and the intermediate shaft 29 the present invention provides a high speed range that is very efficient in operation. The hydraulic control circuit disclosed in Fig. 5 for operating the high range brake 19, the reverse brake 20 and the forward brake 21, is merely illustrative of one hydraulic control circuit that may be utilized for manually controlling the transmission disclosed herein and it is contemplated that numerous other hydraulic control circuits could be used for controlling these brakes. As is also apparent from the foregoing description, a shift from high speed forward drive to low speed forward drive or vice versa may be made at any vehicle speed.

It is contemplated that numerous changes and modification may be made in the present invention without departing from the spirit or scope thereof.

What is claimed is:

1. In an automotive vehicle transmission, the combination of a drive shaft, a driven shaft, means for completing a plurality of forward speed power trains and a reverse power train between said shafts and including a plurality of planetary gear sets each having operatively engaged elements including a sun gear and a planetary gear carrier and a plurality of brakes for holding an element of each of said gear sets against rotation, a first of said planetary gear sets having a first element connected to said drive shaft, and a second and third of said planetary gear sets having first elements of each interconnected and connected to said driven shaft and having second elements of each interconnected and connected to a second element of said first planetary gear set, said brakes being selectively engageable, one of said brakes being effective upon engagement to hold the sun gear of one of said gear sets against rotation to complete one of said forward speed power trains, a second one of said brakes being effective upon engagement when said one brake is engaged to hold the sun gear of another one of said gear sets against rotation to complete a different one of said forward speed power trains, and a third one of said brakes being effective upon engagement when said one and said second one of said brakes are disengaged to hold the planetary gear carrier of a third one of said gear sets against rotation to complete said reverse power train.

2. In an automotive vehicle transmission, the combination of a drive shaft, a driven shaft, a hydraulic torque converter for completing a first power train between said shafts and including an input element and an output element, a planetary gear set for completing a second power train between said shafts and including a sun gear, a ring gear, a plurality of planetary pinions meshing with said sun and ring gears, and a planetary pinion carrier, said ring gear being connected to said driven shaft, said carrier being continually connected to said drive shaft and to said input element of said hydraulic torque converter, a one-way engaging device interconnecting said output element with said driven shaft, and a brake for braking the sun gear of said planetary gear set to cause said driven shaft to overrun the output element of said hydraulic torque converter by means of said one-way engaging device.

3. In an automotive vehicle transmission, the combination of a drive shaft, a driven shaft, means for completing a plurality of forward speed power trains and a reverse power train between said shafts and including a plurality of planetary gear sets each having operatively engaged elements and a plurality of brakes for holding an element of each of said gear sets against rotation, a first of said planetary gear sets having a first element connected to said drive shaft, and a second and third of said planetary gear sets having first elements of each interconnected and connected to said driven shaft and having second elements of each interconnected and connected to a second element of said first planetary gear set, fluid pressure actuated means for controlling the engagement of each of said brakes, and manually operable means for selectively controlling the operation of said fluid pressure actuated means and thereby to selectively actuate said brakes, one of said brakes being effective upon engagement to hold a sun gear of one of said gear sets against rotation to complete one of said forward speed power trains, a second one of said brakes being effective upon engagement when said one brake is engaged to hold a sun gear of another one of said gear sets against rotation to complete a different one of said forward speed power trains, and a third one of said brakes being effective upon engagement when said one and said second one of said brakes are disengaged to hold a planetary gear carrier of a third one of said gear sets against rotation to complete said reverse power train.

4. In an automotive vehicle transmission, the combination including a drive shaft, a driven shaft, a hydraulic torque converter having an input element driven directly by said drive shaft and also having an output element, a one-way engaging device connecting said output element with said driven shaft, gear means including an element connected to said drive shaft and an element connected to said driven shaft drivingly interconnecting said shafts and effective to provide a first power train between said shafts and through said torque converter, said one-way engaging device being so constructed and arranged to allow said output element to drive said driven shaft when said hydraulic torque converter is effective to provide said first power train between said shafts and to allow said driven shaft to overrun said output element when said driven shaft is driven at a higher speed than said output element, and means providing another power train between said shafts and causing said one-way engaging device to permit said driven shaft to overrun said output element of said torque converter and thereby break said first-mentioned power train through said hydraulic torque converter.

5. In an automotive vehicle transmission, the combination including a drive shaft, a driven shaft, a hydraulic torque converter having an input element driven directly by said drive shaft and also having an output element, a one-way engaging device connecting said output element with said driven shaft, gear means including an element connected to said drive shaft and an element connected to said driven shaft drivingly interconnecting said shafts and effective to provide a first power train between said shafts and through said torque converter, said one-way engaging device being so constructed and arranged to allow said output element to drive said driven shaft when said hydraulic torque converter is effective to provide said first power train between said shafts and to allow said driven shaft to overrun said output element when said driven shaft is driven at a higher speed than said output element, and means for providing a relatively higher speed power train between said shafts and causing said one-way engaging device to permit said driven shaft to overrun said output element of said hydraulic torque converter during the establishment of said relatively higher speed power train between said shafts.

6. In an automotive vehicle transmission, the combination including a drive shaft, a driven shaft, a hydraulic torque converter having an input element driven directly by said drive shaft and also having an output element, a one-way engaging device connecting said output element with said driven shaft, gear means including an element connected to said drive shaft and an element connected to said driven shaft effective to provide a first power train between said shafts and through said torque converter, said one-way engaging device being so constructed and arranged to allow said output element to drive said driven shaft when said hydraulic torque converter is effective to provide said first power train between said shafts and to allow said driven shaft to overrun said output element when said driven shaft is driven at a higher speed than said output element, and means including a planetary gear set for providing a relatively higher speed power train between said shafts and causing said one-way engaging device to permit the driven shaft to overrun the output element of said hydraulic torque converter.

References Cited in the file of this patent

UNITED STATES PATENTS

| Number | Name | Date |
|---|---|---|
| Re. 22,466 | Pollard | Apr. 4, 1944 |
| 2,150,950 | Thoma | Mar. 21, 1939 |
| 2,176,138 | Kelley | Oct. 17, 1939 |
| 2,226,760 | Fottinger | Dec. 31, 1940 |
| 2,283,759 | Pollard | May 19, 1942 |
| 2,292,384 | Lysholm | Aug. 11, 1942 |
| 2,301,451 | Pollard | Nov. 10, 1942 |
| 2,326,570 | Schaefer et al. | Aug. 10, 1943 |
| 2,334,394 | Dodge | Nov. 16, 1943 |
| 2,361,104 | Jandasek | Oct. 24, 1944 |
| 2,402,164 | Kelbel | June 18, 1946 |
| 2,414,359 | Carnagua et al. | Jan. 14, 1947 |
| 2,466,244 | Kelbel | Apr. 5, 1949 |
| 2,523,619 | Grebb | Sept. 26, 1950 |
| 2,530,200 | Hobbs | Nov. 14, 1950 |
| 2,549,125 | Paton | Apr. 17, 1951 |
| 2,550,082 | Orr | Apr. 24, 1951 |
| 2,557,421 | Evernden | June 19, 1951 |
| 2,566,518 | Farkas | Sept. 4, 1951 |
| 2,606,652 | Kelbel | Aug. 5, 1952 |
| 2,616,308 | Burnett | Nov. 4, 1952 |
| 2,630,025 | Lapsley | Mar. 3, 1953 |
| 2,687,657 | Kugel et al. | Aug. 31, 1954 |

FOREIGN PATENTS

| Number | Country | Date |
|---|---|---|
| 494,467 | Belgium | July 1, 1950 |